United States Patent
Fox et al.

(10) Patent No.: US 7,321,102 B2
(45) Date of Patent: Jan. 22, 2008

(54) FLOAT SWITCH TRANSIENT SUPPRESSION DEVICE

(75) Inventors: Thomas Bruce Fox, Bristol, VT (US); William Jon Darling, Ferrisburg, VT (US); Rollin Winter Brown, South Burlington, VT (US); Lawrence Carl Maier, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 445 days.

(21) Appl. No.: 10/695,040

(22) Filed: Oct. 27, 2003

(65) Prior Publication Data

US 2005/0087432 A1  Apr. 28, 2005

(51) Int. Cl.
*H01H 3/14* (2006.01)

(52) U.S. Cl. .............. 200/84 R; 200/84 B; 361/58; 361/93.7

(58) Field of Classification Search .............. 200/84 R, 200/84 B; 361/54, 58, 93.7, 111, 119
See application file for complete search history.

(56) References Cited

U.S. PATENT DOCUMENTS 4,167,002 A * 9/1979 Foley .................. 340/450.2
6,714,393 B2 * 3/2004 Nostrand ................ 361/58

* cited by examiner

*Primary Examiner*—K. Richard Lee
(74) *Attorney, Agent, or Firm*—Calfee, Halter & Griswold LLP

(57) ABSTRACT

A float switch system for limiting to desirable levels current and energy entering a tank of combustible liquid comprises: a float switch disposed within the tank; an interface circuit external to the tank and coupled through wiring to the float switch; a passive transient suppression circuit coupled to the wiring external and in proximity to the tank, and operative to limit current and energy entering the tank over the wiring to the desirable levels; and a control circuit coupled to the float switch through the transient suppression circuit and to the interface circuit, the control circuit operative to monitor the status of the float switch with current within the desirable current level and to energize the interface circuit based on the switch status.

27 Claims, 4 Drawing Sheets

FLOAT SWITCH TRANSIENT SUPPRESSION DEVICE

BACKGROUND OF THE INVENTION

The present invention relates to transient suppression devices, in general, and more particularly, to a transient suppression device (TSD) that is coupled in series with electrical wiring connecting a float switch disposed within a tank containing a combustible liquid and an interface circuit external to the tank, the TSD being located external to the tank for limiting to safe levels the current and energy of signals that may enter the tank through the electrical wiring while maintaining a drive current for operating the interface circuit.

An example of a float switch application in a combustible liquid is in connection with a transport aircraft on which one or more float switches is or are disposed within a fuel tank for monitoring the fuel level thereof. The float switch may comprise a magnetic reed switch that is sealed within a tube, for example. A float within the switch tube moves with the level of fuel and renders an electrical connection when the fuel rises above or drops below a predetermined fuel level. Each float switch is electrically connected to an interface circuit external to the tank by electrical wiring which passes through a wall of the tank. The electrical wiring interconnecting the float switch with its interface circuit is disposed within a sealed conduit which keeps the wiring from making contact with the fuel.

The float switch interface circuits vary in function with the aircraft. On some aircraft, the interface circuit acts as a safety device or back-up to prevent overfilling the tank during a fueling or re-fueling process. In this application, the interface circuit comprises a shut-off valve which typically uses currents on the order of two amps maximum, for example. On other aircraft, the interface circuit functions to initiate a fuel transfer between internal tanks of the aircraft. In this application, the interface circuit comprises a fuel transfer valve which typically uses currents on the order of sixty to one-hundred milliamps, for example. In some cases, the float switch may also drive a low fuel level indicator lamp. Such drive current levels are passed into the fuel tank through the interconnecting wiring and float switch.

Under normal operating conditions, a clear separation is maintained between the switch and wiring and the fuel to avoid the possibility of fuel vapor ignition. However, there are possible internal fault conditions in which fuel vapor may make contact with the wiring and/or switch contacts. For example, the conduit seal or the sealed tube or the connection between the conduit and tube may leak permitting fuel vapor to enter the sealed chambers. Other potential fault conditions include: chafing of the wires within the conduit resulting in potential exposure to fuel vapor; and hot short to the aircraft wiring. With the current and energy levels of the present float switch designs, any one of these fault conditions poses the risk of an explosive reaction. Another area of concern is with external threats, like lightning, high voltage wiring shorts, and high intensity radiated fields, for example, passing unsafe current and/or energy levels into the tank through the interconnecting switch wiring.

The Federal Aviation Administration or FAA has been considering these potentially threatening conditions and is on the verge of promulgating mandatory regulations to limit the current and energy levels permitted to pass into an aircraft fuel tank under any conditions, including normal operating conditions. These regulated levels of current and/or energy are intended to prevent an ignition of in-tank fuel vapors under all possible conditions. Under the anticipated FAA regulations, current levels of less than ten milliamps are considered safe, but current levels from ten to thirty milliamps will require an explanation of safeness. RMS current levels greater than thirty milliamps are considered unsafe under the anticipated regulations. In addition, the anticipated FAA regulations limit the energy permitted to enter the tank to less than two-hundred microjoules.

Accordingly, in order to comply with the anticipated FAA regulations, it may be necessary to modify the present float switch system on aircraft to reduce the normal in-tank operating current and energy of such systems while maintaining the current and energy needed to drive the interface electronics for all possible applications, and to protect against potentially threatening conditions as noted above. The present invention is intended to provide for these modifications.

SUMMARY OF THE INVENTION

In accordance with the present invention, a float switch system for limiting to desirable levels current and energy entering a tank of combustible liquid comprises: a float switch disposed within the tank; an interface circuit external to the tank and coupled through wiring to the float switch; a passive transient suppression circuit coupled to the wiring external and in proximity to the tank, and operative to limit current and energy entering the tank over the wiring to the desirable levels; and a control circuit coupled to the float switch through the transient suppression circuit and to the interface circuit, the control circuit operative to monitor the status of the float switch with current within the desirable current level and to energize the interface circuit based on the switch status.

In one embodiment, the interface circuit is disposed a substantial distance from the transient suppression circuit over wiring that is exposed to potential short duration and sustained threats. The transient suppression circuit is operative to maintain current and energy to the tank over the wiring to within the desirable levels notwithstanding a coupling of any one of the threats to the exposed wiring and the control circuit is disposed in proximity to the transient suppression circuit.

In another embodiment, the interface circuit is disposed a substantial distance from the transient suppression circuit over wiring that is exposed to potential short duration and sustained threats. The transient suppression circuit is operative to maintain current and energy to the tank over the wiring to within the desirable levels notwithstanding a coupling of any one of the threats to the exposed wiring and the control circuit is disposed in proximity to the interface circuit and coupled to the passive transient suppression circuit over the exposed wiring.

DETAILED DESCRIPTION OF THE INVENTION

Figure 1:
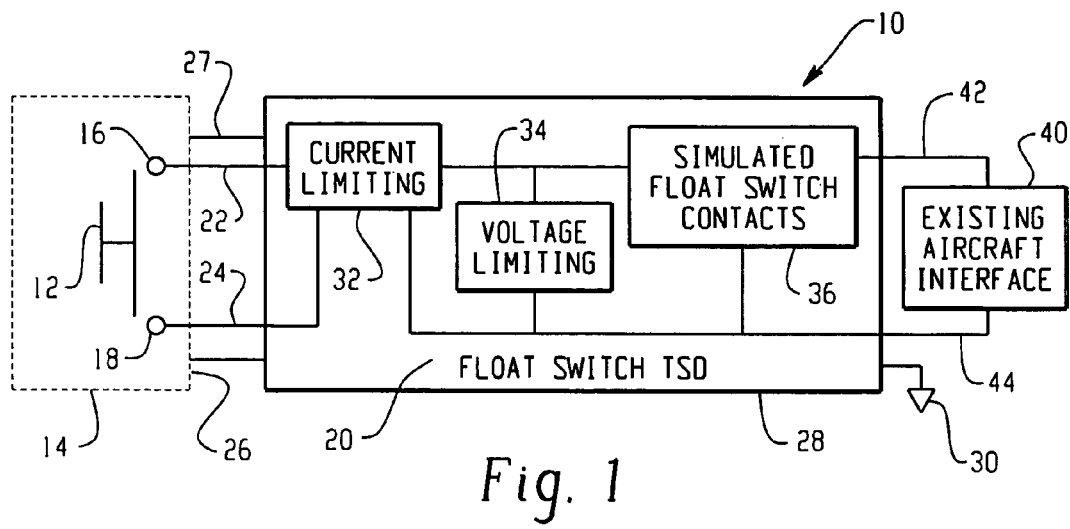
FIG. 1 is a block diagram schematic of a float switch system including a transient suppression device in accordance with one aspect of the present invention.

FIG. 1 is a block diagram schematic of a float switch system 10 including a transient suppression device in accordance with one aspect of the present invention. Referring to FIG. 1, a conventional float switch 12, which may be a magnetically operated reed switch, for example, is disposed within a container 14 containing a combustible liquid for monitoring the level thereof in the container. For the present embodiment, the container 14 may be a fuel tank of an aircraft, for example, but it is understood that the present invention is not limited in application to aircraft fuel tanks and may extend to any tank containing a combustible liquid that may be ignited by an electrical spark or the like. In any event, the float switch 12 includes contacts 16 and 18 which are electrically coupled to a transient suppression device (TSD) 20 over wires 22 and 24, respectively. The float switch 12 is operative to render an electrical connection between the contacts 16 and 18 when the liquid within the container 14 rises above or drops below a predetermined liquid or fuel level.

In one embodiment, the TSD 20 is disposed in close proximity to a wall 26 of the container, preferably on the order of twelve inches away, for example. As noted above, within the tank or container 14, the wires 22 and 24 are contained within a sealed conduit (not shown) to maintain separation from the fuel or liquid. This conduit provides a sealed passage of the wires 22 and 24 from the switch 12 to a sealable opening in the wall 26 through which they pass to the TSD 20. Between the tank wall 26 and TSD 20, the wires 22 and 24 may be contained within a conductive shield 27 which is connected at one end to the wall 26 and at the other end to a conductive enclosure 28 of the TSD 20. The enclosure 28 may be connected to an electrical ground at 30, which may be a frame or structure of an aircraft, for example. Shield 27 acts as an electrical barrier against potential threats coupling or attaching to the wires 22 and 24 by diverting any such threat energy to the aircraft frame through which it is sufficiently absorbed and mitigated.

Within the enclosure 28, the wires 22 and 24 are series coupled through a current limiting circuit or circuits 32 and a voltage limiting circuit 34 is coupled across the wires 22 and 24. The current limiting circuits 32 are designed for the present embodiment to limit the current entering the tank 14 over wire 22 and 24 to current and energy levels considered safe by the FAA. The voltage limiting circuit 34 is designed for the present embodiment to protect the circuitry of the TSD 20 against damaging voltage levels due to short duration threats, like lightning, for example. Upstream of the current limiting circuits 32 is a circuit 36 which is operative to monitor the operation of the float switch 12 and simulate the contact status to drive an interface circuit 40 accordingly.

The interface circuit 40, which may be a liquid flow control valve, a relay and/or an indicator lamp, for example, may be disposed a substantial distance from the TSD 20 and coupled to the circuit 36 thereof over wires 42 and 44, for example. The drive current of the interface circuit 40 is considered unsafe by the FAA for entering the tank 14. Note that in operation, the drive current of the interface circuit 40 is conducted through the circuit 36 of the TSD 20 and does not enter the tank 14 through the float switch 12 as will become better understood from the following description.

Figure 3:
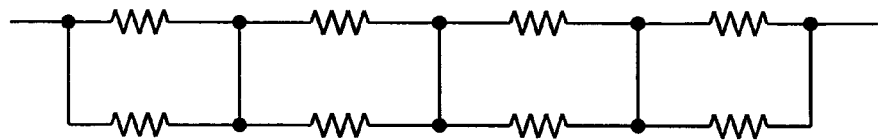
FIG. 3 is a circuit schematic of an exemplary resistor network suitable for use in the transient suppression device.
Figure 2:
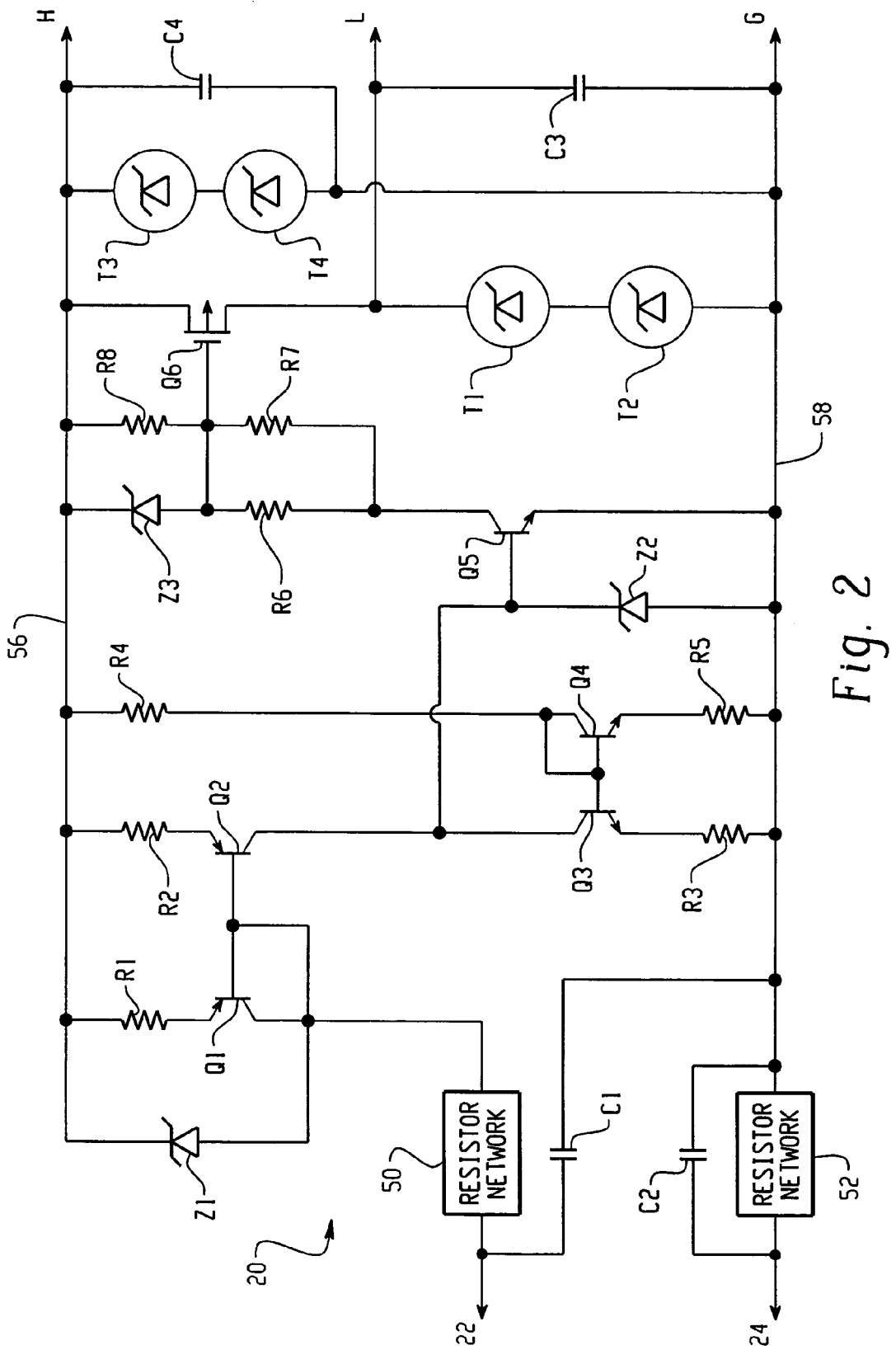
FIG. 2 is a circuit schematic of an exemplary circuit for embodying the transient suppression device.

A circuit schematic of a circuit suitable for embodying the TSD 20 is depicted by way of example in FIG. 2. Referring to FIG. 2, in series with each wire 22 and 24 is an isolation resistor network 50 and 52, respectively. These resistor networks 50 and 52 afford passive isolation and voltage limiting to absorb and thus, prevent undesired or unsafe current and energy levels from entering the fuel tank 14 over wires 22 and 24 which are on the "safe side" of the TSD 20. An exemplary embodiment of a suitable resistor network for 50 and 52 is shown in FIG. 3. In the embodiment of FIG. 3, four pairs of parallel connected resistors are connected in series to form the resistor network. If the worst case in-tank fault condition is presumed to be a fifty ohm resistance between either or both wires 22 and 24 to ground, then all of the resistors of the network may be valued at approximately six thousand ohms, for example, in order to provide sufficient current limiting to the presumed in-tank fault condition. Note that at six thousand ohms per resistor, the lumped or effective resistance of each network 50 and 52 is twelve thousand ohms.

The parallel/series network embodiment of FIG. 3 was chosen based on several limitations such as, for example,: (1) the series resistance path should have a minimum physical separation to prevent arcing across a resistor body due to voltage potential, which separation being enhanced by the addition of more than one resistor to achieve the desired maximum potential voltage present; (2) a parallel path enables redundant separation to achieve an extremely improbable shorting condition; and (3) the parallel/series impedance network should survive and provide the desired safety levels when exposed to aircraft and environmental threat conditions.

Figure 4:
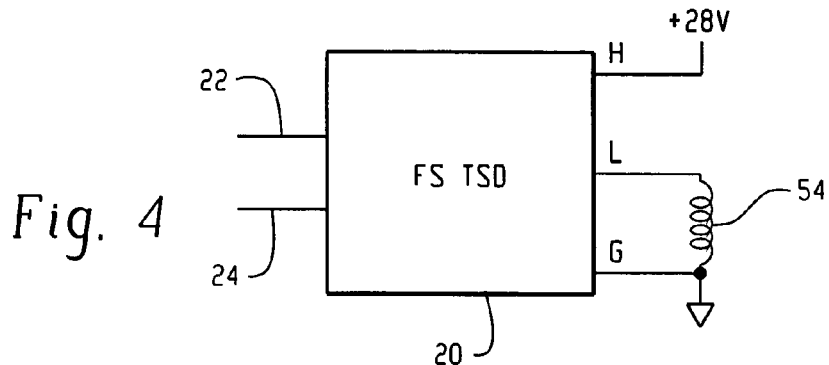
FIG. 4 is a block diagram schematic exemplifying a high side drive configuration of the transient suppression device.
Figure 5:
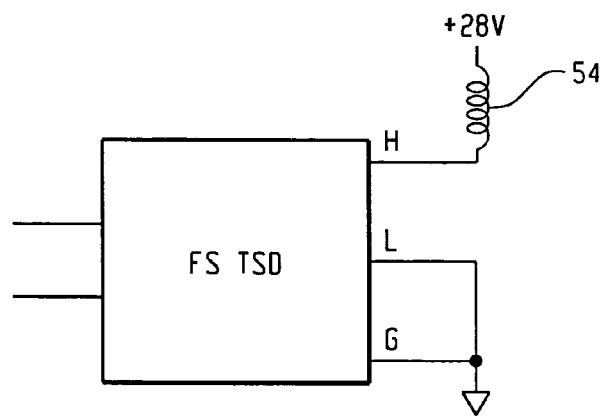
FIG. 5 is a block diagram schematic exemplifying a low side drive configuration of the transient suppression device.

Referring back to FIG. 2, the simulation circuit 36 of the present embodiment offers a high side drive connection (H) or a low side drive connection (L) to the interface circuit 40 and a return or ground connection (G). An example of a high side drive application is shown by the schematic diagram of FIG. 4 in which the interface circuit is embodied by an inductive coil 54 which may be part of a relay circuit or a solenoid for driving a flow valve, for example. In the high side drive case, a DC voltage supply which may be +28 V may be coupled to the H connection and the coil 54 may be coupled across the L and G connections. An example of a low side drive application is shown by the schematic diagram of FIG. 5 in which the interface circuit is embodied by the inductive coil 54 which may be also part of a relay circuit or a solenoid for driving a flow valve, for example. In the low side drive case, the coil 54 is coupled between a DC voltage supply which may be +28 V and the H connection and the L and G connections are coupled together.

Referring back to FIG. 2, in both foregoing described examples, the circuitry of the TSD 20 is powered by the DC voltage supply provided through the H connection to a supply bus 56 and a current return is provided by a ground bus 58 which is connected back to the supply through the G connection. Capacitors C1 and C2 are coupled from wires 22 and 24, respectively, on the safe side of the TSD 20 to the ground bus 58. One side of network 50 is connected to wire 22 and the other side is connected to a current mirror circuit comprising PNP transistors Q1 and Q2 which are coupled together through their base junctions. The collector of Q1 is coupled to its base and the other side of network 50. The emitter of Q1 is coupled to the supply bus 56 through a resistor R1 which may be on the order of 100 ohms for the present design. A zener diode Z1 is coupled cathode to anode across the supply bus 56 and collector junction of Q1 for protecting the base-emitter junction of Q1 against voltage breakdown. In addition, the emitter of Q2 is coupled to the supply bus 56 through a resistor R2 which may also be approximately 100 ohms.

Further, the collector of Q2 is coupled to another current mirror comprising NPN transistors Q3 and Q4 which are coupled together through the base junctions thereof. More specifically, the collector of Q2 is connected to the collector of Q3 and the emitter of Q3 is coupled to the ground bus 58 through a resistor R3 which may be approximately 100 ohms. The collector of Q4 is coupled to its base and to the supply bus 56 through a resistor R4 which may be on the order of 50K ohms, for example. The emitter of Q4 is coupled to the ground bus 58 through a resistor R5 which may be approximately 100 ohms. The collector of Q2 is also connected to a base of another NPN transistor Q5 which is coupled to the ground bus 58 through a zener diode Z2 which protects the base-emitter junction of Q5 against voltage breakdown. The emitter of Q5 is connected to the ground bus 58 and the collector of Q5 is coupled through a parallel connection of resistors R6 and R7 to a gate of a field effect transistor (FET) Q6 which may be a metal oxide semiconductor FET for the present design.

The gate of Q6 is also coupled to the supply bus 56 through the parallel connection of resistor R8 and zener diode Z3. The source of Q6 is connected to the supply bus 56. The drain of Q6 which is the L connection is coupled to the ground bus 58 through a parallel connection of a capacitor C3 and a pair of series connected transorbs T1 and T2 which may be of the type manufactured by International Semiconductor under the part no. SMLJ40A, for example. Moreover, the supply bus 56 which is the H connection is coupled to the ground bus 58 through a parallel connection of a capacitor C4 and a pair of series connected transorbs T3 and T4 which may be of the same type as transorbs T1 and T2. Capacitors C3 and C4 are operative to bypass electromagnetic threats to ground potential.

In operation, current of the current mirror of Q3 and Q4 is set by the resistor R4 and the voltage of the supply bus 56. For the present design, this current may be approximately one-half a milliamp. Current of the current mirror of Q1 and Q2 is set by the series resistance of the two networks 50 and 52 and the voltage of the supply bus 56. For the present design, this current may be approximately a milliamp. Accordingly, when the float switch 12 is closed, current flows through Q1 and the float switch 12 limited by the resistor networks 50 and 52. A like valued current flows through Q2 by the current mirror effect. However, since the current set to flow through Q3 is only one-half of the current flowing through Q2, the remainder of Q2 current is conducted to the base of Q5 and renders Q5 conducting.

With Q5 conducting, the voltage at the gate of Q6 is dropped sufficiently below the source voltage thereof to force Q6 into conduction. In the high side drive connection, when Q6 is conducting, the supply voltage is applied to the L connection, thus energizing the coil 54 (see FIG. 4). In the low side drive connection, when Q6 is conducting, current is permitted to flow through coil 54 from the voltage source through the H and L connections to ground return. In either case, the driving current for the interface circuit flows only through the FET Q6 and the current flowing to the float switch 12 is limited by the resistor networks 50 and 52 to less than one milliamp in the present design.

If the float switch 12 is open-circuited, no current may flow through Q1 or Q2 as a result of the current mirror effect. Since no current flows through Q2, there is no current to drive Q5 into conduction and it remains open circuited. Accordingly, the gate to source voltage of Q6 is insufficient to cause conduction thereof, and therefore, Q6 is rendered open circuited. Thus, when switch 12 is open circuited, no drive current is provided to the interface circuit 40 by the TSD 20. In this manner, under normal operation, the TSD 20 monitors the status of the float switch 12 with a minimal amount of current which is considered well within the safe levels of the anticipated FAA regulations and drives the interface circuit 40 at sufficient current levels which do not pass into the tank 14.

In the event a short duration threat, like a lightning strike or high intensity radiated pulse, for example, is coupled to one or both of the wires 42 and 44 at the unprotected side of the TSD 20, the resistor networks 50 and 52 and corresponding capacitors C1 and C2 will absorb most of the current and energy of the coupled threat. These short duration threats are not expected to last more than around 70 microseconds with a peak voltage of 1200 volts in the worst case. The current and energy which may pass through the resistor network-capacitor combination as a result of the short duration threat is expected to be well within the energy levels of the anticipated FAA regulations. The transorbs T1-T4 and capacitors C3 and C4 at the unprotected side will protect the circuitry of TSD 20 against over voltage damage as a result of and permit the circuitry to survive these short duration threat conditions.

Also, should the one or both of the wires on the unprotected side of the TSD 20 be shorted to a high voltage source, like 115 VAC, for example, for a sustained period of time, the resistor networks 50 and 52 would keep the current passed to the tank over wires 22 and 24 to levels considered safe by the anticipated FAA regulations. However, under these conditions, the circuitry of the TSD 20 may not survive.

The advantages of this aspect of the present invention are: (1) an embodiment of the float switch TSD may use inexpensive and reliable components, like resistor isolation networks, transorbs and capacitors, for example, for current and voltage limiting to protect the tank of combustible liquid from undesirable and unsafe current and energy levels under all possible conditions; (2) normal operating currents are maintained well within levels considered safe on the protected side of the TSD for monitoring the status of the float switch; and, in turn, (3) sufficient currents are provided through a simulation circuit of the TSD for driving the interface circuitry in accordance with the monitored status of the float switch.

Figure 6:
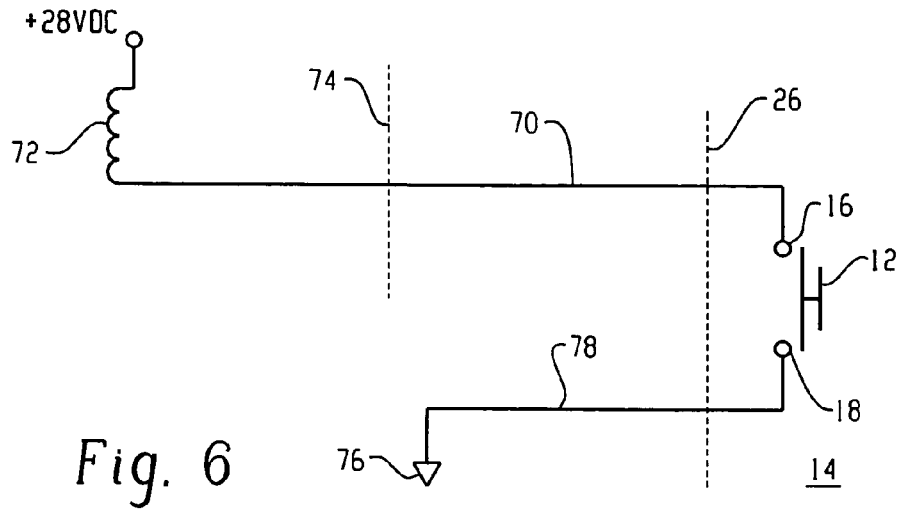
FIG. 6 is an illustration of an exemplary existing float switch system for aircraft applications.
Figure 7:
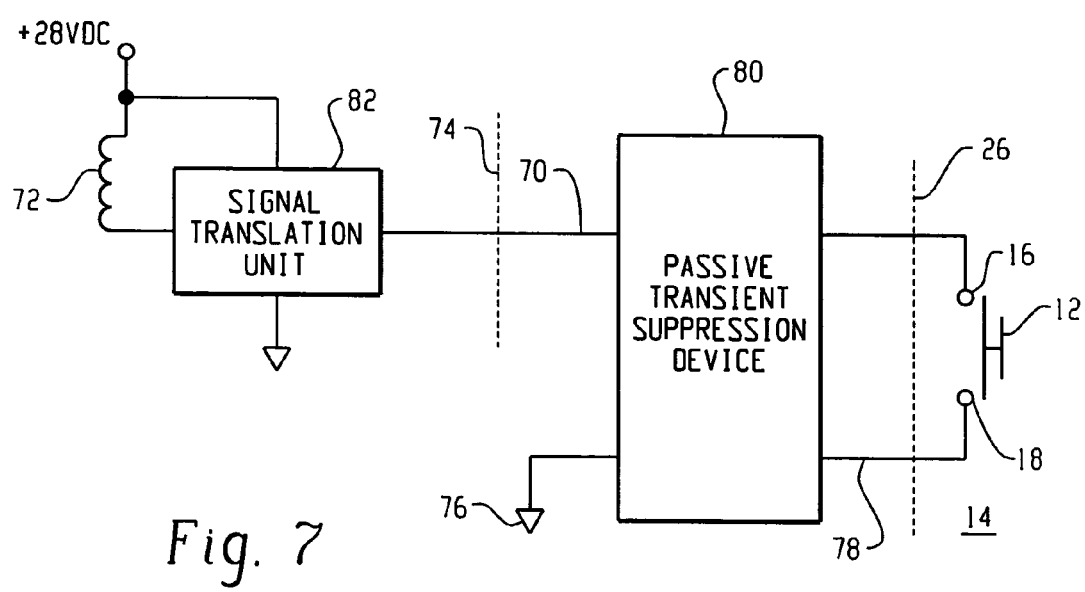
FIG. 7 is a block diagram schematic of a float switch system including a transient suppression device in accordance with another aspect of the present invention.

In some existing aircraft installations, as shown by way of example in the illustration of FIG. 6, a single wire 70 connects the coil 72 of an existing aircraft interface to one contact 16 of the float switch 12. Wire 70 passes through a pressure seal or bulkhead 74 of the aircraft and the wall 26 of the tank 14. The other contact 18 of the float switch 12 is connected to a ground 76 of the aircraft by a wire 78, the ground connection 76 being between the pressure seal 74 and tank wall 26. To install the foregoing described embodiment of the float switch TSD 20 to the existing float switch system may require adding additional wires through at least the pressure seal 74 which is a timely and costly procedure. Referring to FIG. 7, one solution to avoid this procedure and use existing aircraft wiring is to add a passive TSD 80 in series with the wires 70 and 78 between the pressure seal 74 and tank wall 26 for protecting the tank against undesirable current and energy levels. For example, the passive TSD 80 may comprise the resistor network 50 in series with wire 70, resistor network 52 in series with wire 78, and capacitors C1 and C2 connected to the ground 76, as described herein above in connection with FIG. 2.

However, for the coil 72 to operate, the voltage drop across the float switch 12 should be very small. Adding the passive TSD 80 in series with the wires 70 and 78 as proposed in the embodiment of FIG. 7 will increase this voltage drop when the switch 12 is closed, possibly to the point of rendering the interface coil 72 inoperative. So, merely adding the passive TSD 80 using the existing aircraft wiring will not solve the problem completely. To resolve this issue, an active circuit, referred to as a signal translation unit (STU), 82 may be disposed in proximity to the existing aircraft interface device 72 and powered by the same power source which may be +28 VDC, for example. The STU 82 may function to sense the status or impedance change of the float switch and TSD 80 over existing signal line 70 and in response, drive the coil 72 with a low impedance switch. Thus, by providing the drive to operate the coil 72, the STU 82 reduces the normal operating current to the passive TSD 80 to within desirable limits, allows for greater operating voltage drop across the TSD 80 and obviates the need for a pressure seal penetration to add additional wiring.

Figure 8:
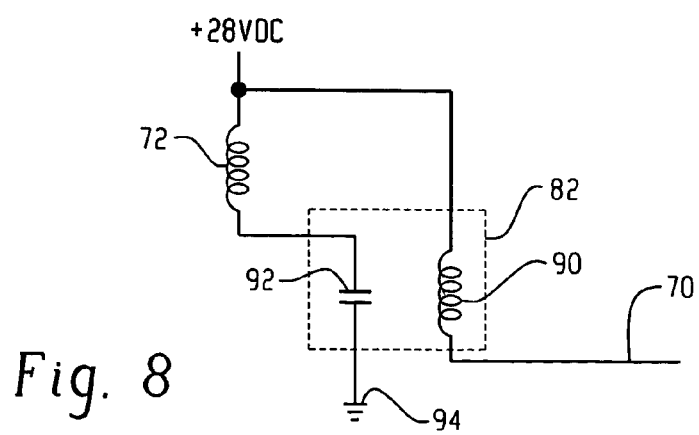
FIG. 8 is a circuit schematic of an exemplary signal translation unit suitable for use in the float switch system of FIG. 7.

In one embodiment as shown by way of example in FIG. 8, the STU 82 may comprise a micro relay 90, for example. The relay 90 may be connected between the power source +28 VDC and the existing wire 70 and include a normally open contact 92 as shown and/or a normally closed contact. The relay contact 92 may be disposed in series with the connection between the coil 72 and aircraft ground 94 in proximity to the coil 72. A drive current to operate the micro relay 90 is typically around a milliamp, for example. Thus, when the float switch 12 closes, the voltage drop across the passive TSD 80 will not defeat the operation of the relay 90. For example, if the resistance of the passive TSD is around twenty-four thousand ohms, then the voltage drop there across at one milliamp is approximately twenty-four volts, leaving around four volts to drive the relay 90 which is more than sufficient.

Accordingly, when the float switch 12 closes, the relay 90 is energized and contact 92 is closed permitting the coil 72 to be energized through the low impedance of the switch contact 92. When switch 12 open circuits, little or no current is conducted over wire 70 and relay 90 is de-energized, thus opening contact 92 and de-energizing the coil 72. The passive TSD 80 will limit the current and energy coupled over wire 70 to the tank 14 to safe and desirable levels under all conditions as described herein above in connection with the embodiment of FIG. 2 and the relay 90 will be protected against pulsed high energy threats over wire 70 by appropriate selection of the relay such that it is not susceptible to pulsed high energy threats.

Figure 9:
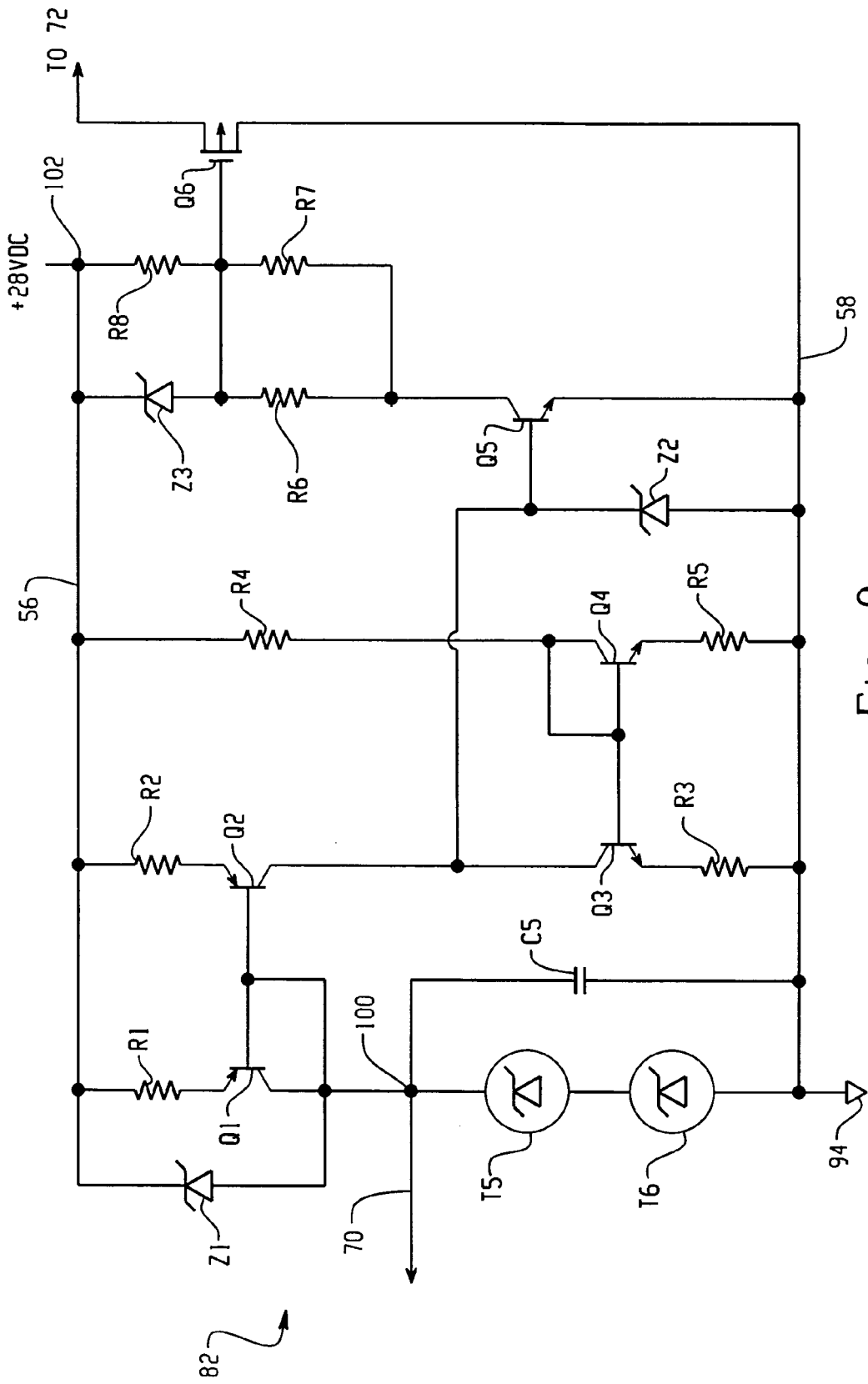
FIG. 9 is a circuit schematic of an alternate embodiment of a signal translation unit suitable for use in the float switch system of FIG. 7.

In an alternate embodiment of the STU 82 as shown by way of example in FIG. 9, current mirror circuitry similar to the circuitry described in connection with the embodiment of FIG. 2 may be included. Circuit elements common to the embodiments of FIGS. 2 and 9 will retain there reference numerals and not be described again here. Referring to FIG. 9, the collector of Q1 may be connected to the passive TSD 80, preferably the resistor network 50, over the existing wire 70 at the connection node 100. The connection node 100 may be coupled to the aircraft ground 94, which is in proximity to the coil interface 72, in series with two transorbs T5 and T6 which may be of the same type as transorbs T1-T4, for example. A capacitor C5 is coupled between node 100 and ground 94 in parallel with the transorbs T5 and T6. The power source +28 VDC, for example, is connected to the supply bus 56 at a circuit node 102 to provide power to the active circuit elements of 82. In addition, the source of MOSFET Q6 is connected to the coil 72.

In operation, the active circuit elements of 82 perform the same functions as described for the embodiment of FIG. 2. Accordingly, the MOSFET Q6 conducts current to energize coil 72 when the float switch is closed and open circuits to de-energize coil 72 when the float switch is open. Current that flows over wire 70 under normal float switch operation will be limited to the resistance of the passive TSD 80 which may be approximately one-half milliamp as described supra. Transorbs T5 and T6 and capacitor C5 protect the circuitry of 82 against transient threats coupled over wire 70, like lightning and pulsed high intensity radiated fields, for example. However, while the current and energy levels to the tank are maintained at safe and desirable levels from a steady state short of wire 70 to a high voltage like 115 VAC, for example, by the passive TSD 80, the circuitry of 82 may not survive such a threat.

While the present invention has been described herein above in connection with one or more embodiments, it is understood that such embodiments were provided by way of example and not intended to limit the invention in any way. Accordingly, the present invention should be construed in breadth and broad scope in accordance with the recitation of the claims appended hereto.

We claim:

1. A float switch system for limiting to desirable levels current and energy entering a tank of combustible liquid, said system comprising:
   a float switch disposed within said tank;
   an interface circuit external to said tank and coupled through wiring to said float switch;
   a passive transient suppression circuit coupled to said wiring external and in proximity to said tank, and operative to limit current and energy entering said tank over said wiring to the desirable levels; and
   a control circuit coupled to said float switch through said transient suppression circuit and to said interface circuit, said control circuit operative to monitor the status of said float switch with current within the desirable current level and simulate the status of the float switch to energize said interface circuit based on said switch status.

2. The system of claim 1 wherein the interface circuit is rendered energized with current greater than the desirable current level.

3. The system of claim 1 wherein the interface circuit is disposed a substantial distance from the transient suppression circuit over wiring that is exposed to potential short duration and sustained threats; and wherein the transient suppression circuit is operative to maintain current and energy to the tank over the wiring to within the desirable levels notwithstanding a coupling of any one of said threats to the exposed wiring.

4. The system of claim 3 wherein the control circuit is disposed in proximity to the transient suppression circuit.

5. The system of claim 4 wherein the control circuit comprises a first circuit coupled to the float switch through the transient suppression circuit for monitoring the status of the float switch with current limited by an impedance of the transient suppression circuit; and a second circuit including a switch circuit controlled by the first circuit to energize the interface circuit based on said monitored status.

6. The system of claim 5 wherein the first circuit comprises a pair of current mirror circuits for monitoring the status of the float switch.

7. The system of claim 5 wherein the second circuit comprises both a high side drive connection and a low side drive connection.

8. The system of claim 5 wherein the switch circuit comprises a solid-state switch driven by the first circuit.

9. The system of claim 5 wherein the passive transient suppression circuit comprises a resistor network; and wherein the first circuit is coupled to a ground connection through the resistor network and float switch.

10. The system of claim 9 wherein the passive transient suppression circuit comprises capacitance coupled from said resistor network to the ground connection.

11. The system of claim 3 wherein the control circuit is disposed in proximity to the interface circuit and coupled to the passive transient suppression circuit over the exposed wiring.

12. The system of claim 11 wherein the control circuit comprises an electro-mechanical device coupled to the float switch through the exposed wiring and transient suppression circuit, said electro-mechanical device including a contact responsive to the status of the float switch for energizing the interface circuit.

13. The system of claim 12 wherein the contact rendering an electrical isolation between the exposed wiring and the interface circuit.

14. The system of claim 13 wherein the electro-mechanical device comprises a relay responsive to the status of the float switch and energized by a current within the desirable current level.

15. The system of claim 14 wherein the energization current of the relay is limited by an impedance of the transient suppression circuit; and wherein the relay is operative notwithstanding a voltage drop across the transient suppression circuit resulting from the energization current.

16. The system of claim 11 wherein the control circuit comprises a first circuit coupled to the float switch through the exposed wiring and transient suppression circuit for monitoring the status of the float switch with current limited by an impedance of the transient suppression circuit; and a second circuit including a switch circuit controlled by the first circuit to energize the interface circuit based on said monitored status.

17. The system of claim 16 wherein the first circuit comprises a pair of current mirror circuits for monitoring the status of the float switch.

18. The system of claim 16 wherein the switch circuit comprises a solid-state switch driven by the first circuit.

19. The system of claim 16 wherein the passive transient suppression circuit comprises a resistor network; and wherein the first circuit is coupled to a ground connection through the exposed wiring, resistor network and float switch.

20. The system of claim 19 wherein the passive transient suppression circuit comprises capacitance coupled from said resistor network to the ground connection.

21. The system of claim 1 wherein the control circuit comprises a voltage limiting circuit for protecting the circuitry of the control circuit from short duration threats.

22. The system of claim 21 wherein the voltage limiting circuit comprises voltage transient suppression and capacitive elements.

23. The system of claim 1 wherein the float switch system is disposed on an aircraft for limiting to desirable levels the current and energy entering a fuel tank of said aircraft.

24. The system of claim 23 wherein the interface circuit comprises any one of the group consisting of a fuel control valve, a fuel transfer valve, a relay, a solenoid, and a fuel level indicator.

25. The system of claim 23 wherein the interface circuit is disposed a substantial distance from the transient suppression circuit over wiring that is exposed to potential short duration and sustained threats; and wherein the transient suppression circuit is operative to maintain current and energy to the fuel tank over the exposed wiring to within the desirable levels notwithstanding a coupling of any one of said threats to the exposed wiring.

26. The system of claim 25 wherein the control circuit is disposed in proximity to the interface circuit and coupled to the passive transient suppression circuit at the fuel tank over existing aircraft wiring.

27. The system of claim 26 wherein the passive transient suppression circuit comprises a resistor network; and wherein the control circuit is coupled to a ground connection at the fuel tank through the exposed wiring, the passive transient suppression circuit and float switch.

* * * * *